United States Patent [19]
Panin

[11] Patent Number: 5,226,617
[45] Date of Patent: Jul. 13, 1993

[54] DEVICE FOR JETTISONING A PAYLOAD FROM A SPACECRAFT

[75] Inventor: Fabio Panin, Valkenburg, Netherlands

[73] Assignee: Agence Spatiale Europeenne, Paris, France

[21] Appl. No.: 857,611

[22] Filed: Mar. 25, 1992

[30] Foreign Application Priority Data

Mar. 28, 1991 [FR] France .............. 91 03761

[51] Int. Cl.$^5$ .............................. B64G 1/22
[52] U.S. Cl. .............................. 244/158 R; 244/161; 292/35; 294/119.1
[58] Field of Search ............ 244/158 R, 161, 63; 292/35, 36, DIG. 49; 294/119.1

[56] References Cited

U.S. PATENT DOCUMENTS

| | | | |
|---|---|---|---|
| 2,135,854 | 11/1938 | Smiggen | 292/35 |
| 2,817,254 | 12/1957 | Barnes et al. | 294/119.1 |
| 2,925,754 | 2/1960 | Fillman . | |
| 3,140,886 | 7/1964 | Cotilla et al. . | |
| 3,575,451 | 4/1971 | Konrad | 292/35 |
| 3,666,216 | 5/1972 | Nagy et al. | 244/161 |
| 4,119,051 | 10/1978 | Orndorff, Jr. | 244/161 |
| 4,181,062 | 1/1980 | Bernstein et al. | 244/158 R |
| 4,506,852 | 3/1985 | Adams et al. | 244/161 |
| 4,625,619 | 12/1986 | Ceniza | 244/158 R |
| 4,682,804 | 7/1987 | Palmer et al. . | |
| 4,864,910 | 9/1989 | King et al. . | |
| 4,929,009 | 5/1990 | Vandersluis et al. | 244/161 |
| 5,005,786 | 4/1991 | Okamoto et al. | 244/161 |
| 5,040,748 | 8/1991 | Torre et al. | 244/158 R |
| 5,125,601 | 6/1992 | Monford, Jr. | 244/161 |

FOREIGN PATENT DOCUMENTS 828937  6/1938  France .

Primary Examiner—Galen Barefoot
Attorney, Agent, or Firm—Bell, Seltzer, Park & Gibson

[57] ABSTRACT

A device for jettisoning a payload from a spacecraft, the device comprising: connection means between the payload and the spacecraft; an energy storage device for jettisoning the payload; and a releasable latching device for latching the payload to the spacecraft. In the device for jettisoning a payload: the connection means comprises a single rod in alignment with the axis of symmetry of the jettisoning device and having a first end fixed to the payload; the energy storage device acts on the first end of the connection rod; and the releasable latching device acts on the second end of the connection rod, said device being fixed to the spacecraft. Application to the aerospace industry.

13 Claims, 6 Drawing Sheets

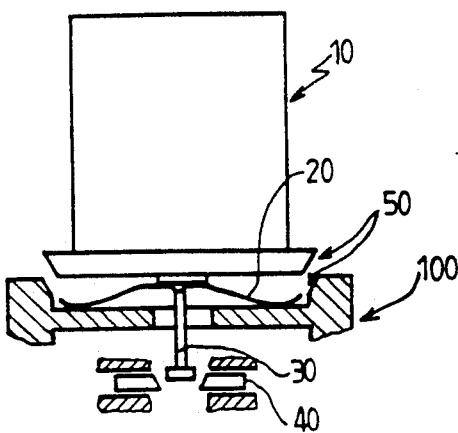
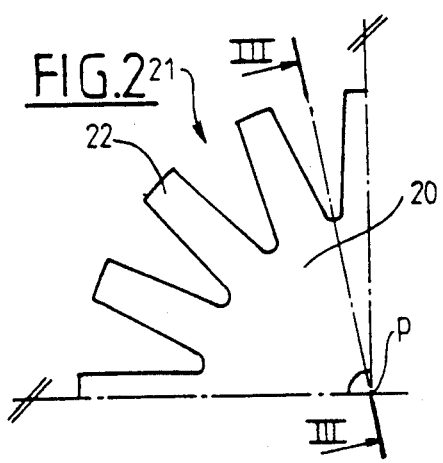
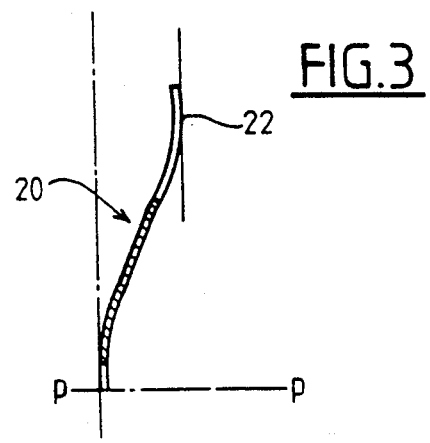
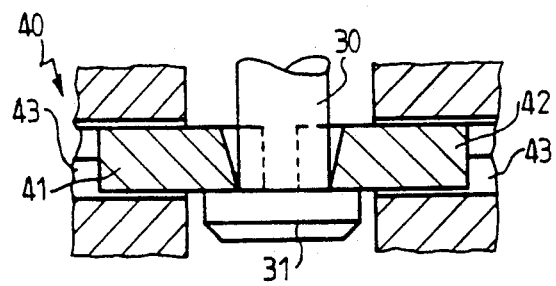
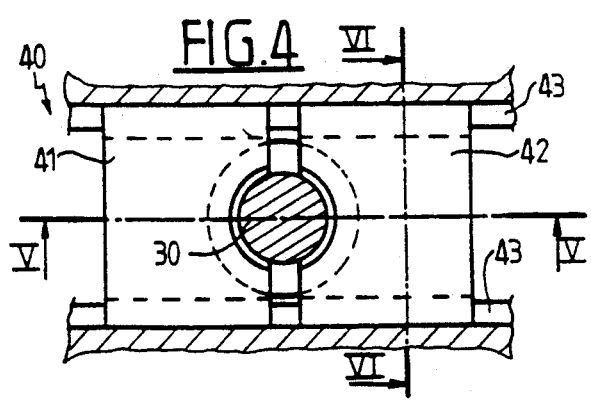
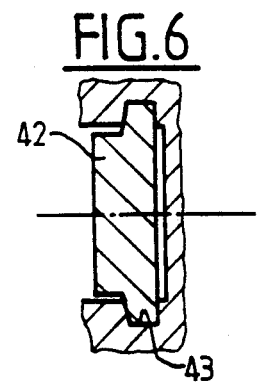

t=0 t=8.E-1 t=1.2 t=1.6 t=1.76

DEVICE FOR JETTISONING A PAYLOAD FROM A SPACECRAFT

The present invention relates to a jettisoning device, i.e. a mechanism which is used in space technology to eject a payload from a spacecraft, and in particular from a satellite. It constitutes a device which combines both of the following functions:

physical interconnection of the payload and the satellite so long as the device is not activated; and controlled separation of the payload and the satellite on activation.

It is assumed below that the device is operated in the absence of any gravity: however although the device is essentially intended for space applications, the validity of the concept on which it is based is not affected by the gravitational effect.

BACKGROUND OF THE INVENTION

There are various reasons why a payload may need to be jettisoned from a satellite. Typically, it is a safety technique used in last resort when the payload cannot be recovered on returning to Earth, or when the payload has failed and cannot be repaired, or when the payload constitutes a danger for satellite integrity.

The ideal jettisoning device is one that makes it possible, on actuation, to cut all physical ties between the payload and the satellite instantaneously while being capable of imparting a velocity to the payload such as to enable it to cover a predetermined safety distance in the shortest time. Jettisoning should take place in controlled manner with minimum transfer of energy to the spacecraft so as to reduce perturbations induced by rapid separation of the payload, i.e. by the reaction forces due to the fact that releasing the stored ejection energy requires devices to be activated that cause transient impacts to be exchanged between the various components of a jettisoning device. Such reduction in perturbations is a condition that is very difficult to satisfy in practice and it corresponds to one of the priority needs in the art in question that has yet to find a satisfactory solution.

In this respect, two elements are critical for satisfying this condition: the device that stores the energy for ejecting the payload; and the device that provides controlled release of the energy stored in this way.

Essentially two types of solution are used for the device that stores jettisoning energy:

preloaded springs in which the jettisoning energy is stored in the form of elastic energy; or devices containing a gas or a liquid under pressure for providing the thrust required for jettisoning.

The solution using fluid under pressure is of complex design and is used particularly for jettisoning large-sized items, such as launcher fairings, rather than payloads having the dimensions under consideration in the present invention.

Devices based on the use of springs are very common: to this end a variety of designs exist with different spring dispositions. It is common to use one or more helical springs that are preloaded in compression. Devices using a plurality of springs appear to satisfy the requirements of the designers of this type of device, particularly because they increase operating safety given that failure or jamming are the most probable types of breakdown for a spring.

Naturally, the disposition of a spring is closely tied to the retaining device adopted for holding the spring under tension, i.e. the latching device, and also to the guide device which is normally provided for controlling the motion of the payload while it is being subjected to the action of a spring.

Pyrotechnical devices have been very widely used for actuating jettisoning devices and for unlatching the retaining devices.

In particular, explosive nuts and bolt-cutters can constitute a satisfactory solution, particularly since they are now standard tools. However, they cannot be used on their own because of the limit on the size of the part to be cut (the part is typically 12.7 mm (0.5 inches) in diameter, which in turn puts a limit on the load-carrying capability of the system). To overcome these limitations, a dedicated latching device could be used for activation by firing a pyrotechnical device; alternatively, it would be possible merely to use a set of pyrotechnical devices.

However, the increasing complexity of the project makes the use of pyrotechnical devices not very attractive. In addition, a synchronization problem may arise in a distributed system of pyrotechnical devices. Solutions to this problem exist, but they involve further penalties in terms of design complexity.

In any event, the operating safety of pyrotechnical devices may be questioned if their performance is considered in terms of lifetime and the principle on which they operate. No matter what the success rate of samples tested, it nevertheless remains possible that a pyrotechnical device may be defective and fail.

Pyrotechnical bolt-cutters are often used for separating a Marman clamp. This type of clamp is doubtless the device that is most commonly in use, probably because of the simplicity of its operating principle.

Nevertheless, it suffers from a certain number of drawbacks which, in the opinion of the Applicant, are usually overlooked by persons skilled in the art. These drawbacks are as follows:

a. The activation dynamics for releasing a pretensioned clamp constitute a stochastic event. The vibrations of the clamp and its interactions with the surrounding items can be predicted only with the help of dedicated computer models, and only to a certain extent. Real dynamic behavior may differ significantly because of strong dependence on certain parameters, such as prestress, interface geometry, and manufacturing tolerances, and it may exhibit peculiarities. This is normally taken into account by adding devices for catching the clamp after it has been released and for damping vibrations. Also, confidence in the repeatability of clamp behavior is based on testing which can be very expensive, in particular for items of large size, and is sensitive to variations in the parameters mentioned above.

b. To ensure that the jettison device opens properly, the clamp must be released extremely quickly. This may be difficult to achieve in practice, and jamming may take place because of asymmetrical spring action, particularly when a plurality of springs are used.

c. To prevent jamming with bolt-cutters, the clamp must be free to rotate without limit. This means that it may also be necessary to have specially designed bolt-clamping devices.

Naturally that increases the complexity of a project that was initially simple. An interesting solution is that adopted for the Cassini spin and jettison device. A Marman clamp is made up of a certain number of individual clamps uniformly spaced apart around a separation ring. Each individual clamp is activated by a preloaded spring and is held in place by a prestressed cable. The cable is cut with pyrotechnical devices. This solution can allow some mass saving, in particular for clamps of large size. A container is naturally also provided for the cable.

Three publications are mentioned below illustrating the state of the art relating to the field of the present invention.

The article "The design and analysis of a double swivel toggle release mechanism for the Orbiter stabilized payload deployment system" by G. King and T. Sai, 23rd Aerospace Mechanisms Symposium, 3-5 May, 1989, pp. 39-57, NASA-CP-3032 describes a release mechanism which uses a swivel screw hinge and three retraction means acting radially for release purposes.

Nevertheless, in that solution, the release device is activated by pyrotechnical means.

The article "A clamp mechanism for deployable three-ton payloads" by R. Birner and H. Ral. 15th Aerospace Mechanisms Symposium, May 14-15 1981, pp. 375-390, NASA-CP-2181 describes, inter alia, a latching or clamping device in which the latching means is withdrawn by means of a system including a hinge and a slide.

Also, the article "A spring-actuated spin and ejection device for interplanetary missions" by V. Comparetto and P. Coste, 4th European Space Mechanism and Tribology Symposium, 20-22 Sep., 1989, pp. 207-214, ESA-SP-299 describes the use of a Marman clamp which includes a plurality of individual clamps held in place by a cable.

An object of the present invention is thus to provide a device for jettisoning a payload which satisfies practical requirements better than prior art devices of the same type and for the same purpose, in particular with respect to:

the energy interchanged between the payload and the satellite is minimized, while nevertheless enabling payload separation to take place in a predefined sequence; this has the consequence of reducing the vibration and perturbations induced on the satellite by jettisoning the payload (which may be a problem in some applications), i.e. on the experiments or operations that are taking place when jettisoning from the satellite occurs, with this being for the purpose of avoiding significant data loss or damage to on-board instruments or even the interruption of all on-going experiments or operations; in this respect, i.e. jettisoning while inducing only small disturbances on the satellite and thus having only a small impact on the orientation thereof, it was decided during development of the jettisoning device of the present invention to eliminate the use of Marman clamps and also the use of pyrotechnical devices as mentioned above;

the initial velocity of the jettisoned payload ensures that given clearance from the satellite is obtained after a predetermined length of time, with said clearance being specified as an allowable safety "envelope" for the payload, so that after separation from the satellite the payload is free to move without interfering therewith;

it has adequate stiffness to enable the payload to operate in orbit and for transmitting launch or re-entry loads, which may be a decisive factor in the design of a jettisoning device, depending on the characteristics of the payload;

there is no risk of failure or jamming in the spring that stores the minimum energy required for imparting the ejection velocity to the payload; and no guidance is required for the payload.

The objects mentioned above make it possible to associate simple structure with increased lifetime, thereby making the jettisoning device of the invention highly effective, i.e. behaving very similarly to the ideal device mentioned above.

SUMMARY OF THE INVENTION

The present invention provides a device for jettisoning a payload from a spacecraft, the device comprising: connection means between the payload and the spacecraft; an energy storage device for jettisoning the payload; and a releasable latching device for latching the payload to the spacecraft; wherein the connection means comprises a single rod in alignment with the axis of symmetry of the jettisoning device and having a first end fixed to the payload; the energy storage device acts on the first end of the connection rod; and the releasable latching device acts on the second end of the connection rod, said device being fixed to the spacecraft.

In a preferred embodiment of the jettisoning device of the invention: the second end of the connection rod is fitted with a swivel-head bolt; and the releasable latching device comprises: two half-collars for latching to the swivel-head bolt fitted to the connection rod; two hinge-and-slide systems each stationary at one end and connected at its other end to one of the two half-collars; and a balancing fork in which each arm acts on one of the two hinge-and-slide systems under drive from an axial slider actuated by a spring so as to cause the two half-collars to slide on corresponding rails and release the swivel-head bolt, thereby releasing the connection rod and the jettisoning energy, the balancing fork being suitable for pivoting about a hinge in the event of one of the two half-collars failing to slide, i.e. jamming, in which case, the connection rod is disengaged by its pivoting head bolt pivoting against the jammed half-collar and under the action of the energy storage device acting on the firstly end of the connection rod.

In a preferred embodiment of the jettisoning device of the invention, the device for storing the energy for jettisoning the payload is constituted by a single diaphragm spring provided with radial notches and having a profile in axial section that bulges.

In yet another preferred embodiment of the jettisoning device of the invention, there exists a separation interface between the satellite and the payload, which interface is defined by a seat constituted by a conical surface.

In an advantageous variant of the embodiment in which there exists a separation interface between the satellite and the payload, the interface is defined by a seat constituted by a tetrahedral surface.

In addition to the above dispositions, the invention also includes other dispositions that appear from the following description.

BRIEF DESCRIPTION OF THE DRAWINGS

Embodiments of the invention are described by way of example with reference to the accompanying drawings, in which:

FIG. 1 is a diagram showing the main components of the jettisoning device of the present invention: for reasons of simplicity, the release device has not been shown, and the latching device is shown as being disengaged from the connection rod;

FIG. 2 shows a fragment of the diaphragm spring used as the device for storing the energy required for jettisoning the payload in the context of the present invention; the shape of the radial notches is given purely by way of example (because of its symmetry, the spring is shown over 90°);

FIG. 3 is a section on III of FIG. 2: it is a profile substantially in the form of an inverted S, in a plane that includes the axis of the diaphragm; the tangent to the outer end of the profile is perpendicular to the main axis of symmetry p of the jettisoning device;

FIG. 4 is a diagrammatic plan view of the device for latching the connection rod between the satellite and the payload to be jettisoned;

FIG. 5 is a section on V through the latching device shown in FIG. 4;

FIG. 6 is a section on VI through the same device of FIG. 4;

DETAILED DESCRIPTION

Figure 7:
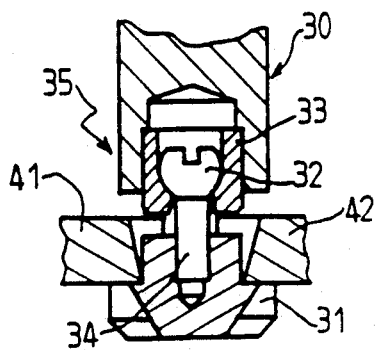
FIG. 7 is a partially cutaway axial section through swivel fastening means used in the context of the present invention between the latching device and the connection rod.

Naturally it should nevertheless be understood that these drawings and the corresponding description are given purely to illustrate the invention and they do not constitute any kind of limitation.

In an attempt to eliminate the drawbacks present in prior art solutions, the Applicant has critically examined various existing solutions as mentioned above, and has been led to define design criteria for the main components of a device for jettisoning a payload from a spacecraft, and in particular from a satellite, i.e. the following components:

the separation interface between the satellite and the payload to be jettisoned;

the device for storing the energy required for jettisoning the payload;

the connection means between the payload and the satellite; and the releasable latching device for retaining the payload on the satellite, which provides controlled release of the jettisoning energy.

This procedure has been followed while keeping in mind the objects on which the present invention is based and while simultaneously bearing in mind that the critical and comparative analysis of prior art solutions shows that no existing device can be considered as being satisfactory apart from certain applications such as jettisoning the fairing of a launcher, which applications are significantly different from the intended applications of the present invention.

In addition, the novel concept which has been put forward in the context of the present invention has been verified as being valid by a feasibility study.

For the preliminary project and for evaluating the performance of the jettisoning device proposed in the context of the present invention, the following constraints should be taken into consideration:

1. payload weight: 100 kg (typical, may reach 500 kg);
2. dimensions of payload: 0.90 meters (m)×0.90 m (base), 1.30 m (height);
3. offset between payload and its center of mass (CM): 0.20 m maximum relative to satellite;
4. ejection velocity: greater than 0.25 m/s;
5. safety "envelope": a cone having an apex angle of 40°;
6. stiffness: sufficient to satisfy the requirements of providing fastening between the payload and the satellite in orbit;
7. fastening force: sufficient to satisfy said requirements;
8. energy exchanged between the payload and the satellite: to be minimized;
9. release of stored jettisoning energy: to be performed while imparting minimum impulsive stresses on the satellite:
10. design simplicity: to be maximized;
11. operating safety: keep high in terms of a high level of predictability, i.e. enabling the payload to be separated in a predefined sequence;
12. "redundancy" of latching: this is to take account of the possibility that an operating fault may occur when releasing the latching device, and that this must not prevent the payload being jettisoned; and
13. lifetime: not less than five years before activation.

Naturally, the values given above for the various constraints are indicative only and are intended solely to bound the range of applications in the context of the present invention. In particular, the constraints defined by points 6 and 7 above depend strongly on the intended application, which therefore needs to be defined accurately. Nevertheless, the constraint mentioned at point 6 is not a governing parameter of the project, it mainly affects the separation interface. Although only qualitatively, it is the constraints numbered 8 and 9 that characterize the jettisoning device of the invention and that distinguish it in comparison with existing devices.

FIG. 1 is a diagrammatic view of the main component mentioned above. This figure shows the payload 10 in the process of being ejected under thrust from the main spring 20. The release device (cf. details in FIG. 11) is not shown in diagrammatic FIG. 1 for reasons of simplicity.

It is the normal practice to use devices including a plurality of springs so as to increase operating safety. However, this justification has not been demonstrated in fact. On the contrary, spring failure is a highly unlikely event.

In addition, this risk can be reduced by a suitable manufacturing method, including screening tests prior to assembly, and by quality control.

Functionally, one spring suffices, and using additional springs merely increases the complexity of the project. The effects of asymmetrical spring thrust which may be due, inter alia, to non-uniform distribution of friction between the springs, can degrade performance. That is why it is preferable in the context of the present invention to use a single spring.

To ensure symmetrical action on the payload and good ability to compensate for the CM offset between the payload and the satellite, it is necessary to use a spring of large diameter. This rules out helical springs. That is why a large-sized diaphragm spring 20 having radial notches 21 (cf. FIG. 2) shaped to provide the required load/deformation characteristic has been adopted in the context of the present invention. The profile of the cross-section of the spring 20 is designed to ensure that the spring acts smoothly during ejection, and it may be of the type shown in FIG. 3 (with reference 22 in this figure and also in FIG. 2 corresponding to the teeth of the diaphragm spring 20 between consecutive notches 21).

In theory, minimum spring action is required for jettisoning the payload 10 after it has been separated from the satellite 100. A decisive parameter is constituted by ejection velocity: the force exerted by the spring must accelerate the payload until it reaches the required velocity. It follows that the lower the ejection velocity, the less the action that the spring needs to provide. Unless special reasons require a particularly high ejection velocity to be selected, values in the range 0.25 m/s to 0.50 m/s are normally acceptable. Given the limits imposed on a payload suitable for use in the context of the present invention, the above reduces to a need for a spring that is relatively small. The spring constant K can be calculated using the principle of energy conservation, setting the kinetic energy of the jettisoned payload of mass m equal to the resilient energy stored in the jettisoning spring when deformed through a distance x, as follows:

$$\tfrac{1}{2}mv^2 = \tfrac{1}{2}Kx^2$$

where:
m = 100 kg
v = 0.25 m/s
x = 0.03 m.
It follows that:

$$K = m(v/x)^2 = 69.4 \text{ N/m}.$$

It is normal practice to adopt mechanical guidance for the payload while the spring is thrusting it. Nevertheless, simulations show that:

if the CM offset of the payload (relative to the resultant of the force exerted by the spring) is small, then the guidance has no effect in theory and is therefore not required; and if the offset is large (e.g. because of a spring failing or jamming, when a plurality of springs are used for jettisoning), then guidance increases the reaction forces exchanged between the payload and the satellite and amplifies vibrations of flexible appendages. This explains why guidance subjects the system to additional stress.

Thus, if operating failure of the kind that makes guidance theoretically required is itself eliminated, then there is no need for such guidance.

As a result, guidance devices are not provided in the jettisoning device of the present invention. Its design is such that the ejection velocity vector has a correct direction and the payload does not move out from the above-mentioned safety "envelope".

As already mentioned above, the stiffness to be provided for the physical connection between the payload and the satellite depends on payload constraints.

It should be specified that total stiffness is defined by:
1. the stiffness of the interface 50 (cf. FIG. 1) between the payload 10 and the satellite 100; and
2. the stiffness of the connection (cf. reference 30 in FIG. 1) between said payload 10 and the satellite 100.

The interface is a primitive conical surface 50 providing the payload with a seat capable of withstanding axial forces and lateral forces, under the action of the connecting force. Such a solution is defined, for example, by the possibility of giving the interface the configuration of a large diameter conical gear wheel, with the teeth of such a gear wheel providing additional twisting stiffness.

Figure 16:
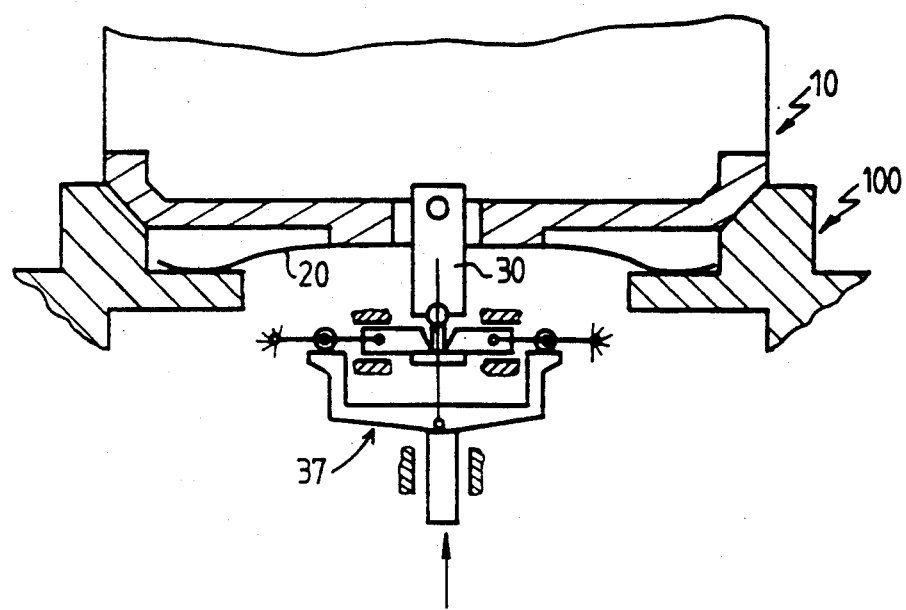
FIGS. 16 and 17 are diagrammatic axial section views that differ from each other in the location of the separation interface between the satellite and the payload, said interface being relatively distant from the center of mass (CM) of the payload in FIG. 16, while being substantially at the same level as the center of mass in FIG. 17; and Diagrams 18a to 18e and 19a to 19e are drawings obtained in a simulation study and they illustrate the principle on which the jettisoning device of the invention operates at several different instants, firstly when both half-clamps unlatch normally and secondly when only one of the two half-clamps unlatches, while the other remains jammed: in which case the figures show in particular how the swivel-head bolt fitted to the end of the connection rod operates, to ensure that disengagement takes place in any event.
Figure 17:
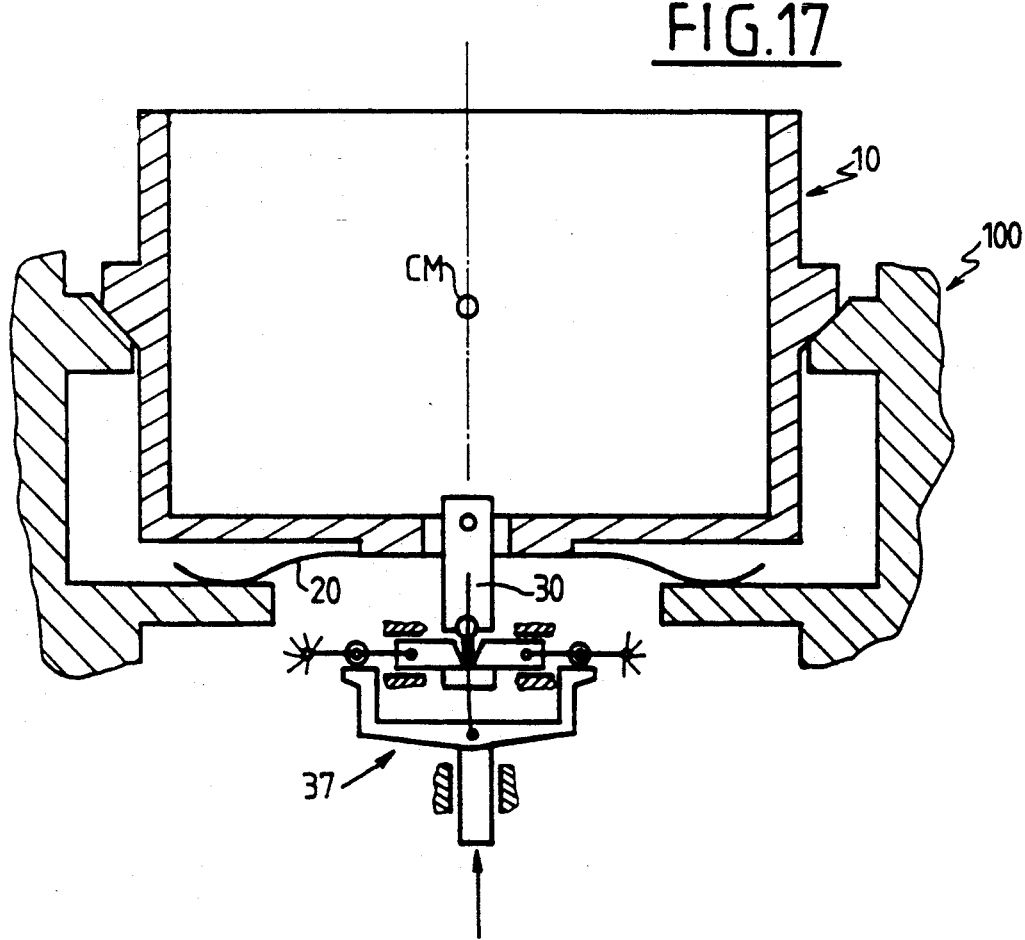
Figure 18A:
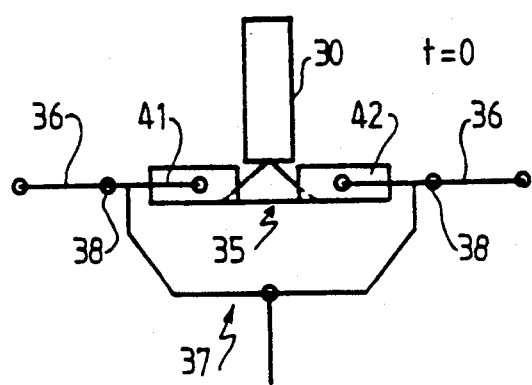
Figure 18D:
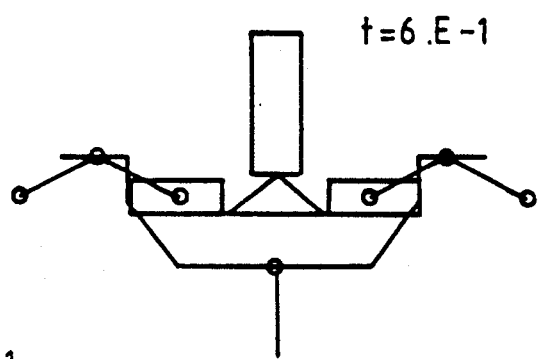
Figure 18B:
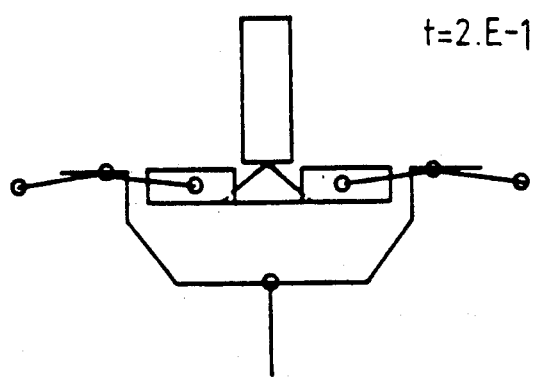
Figure 18E:
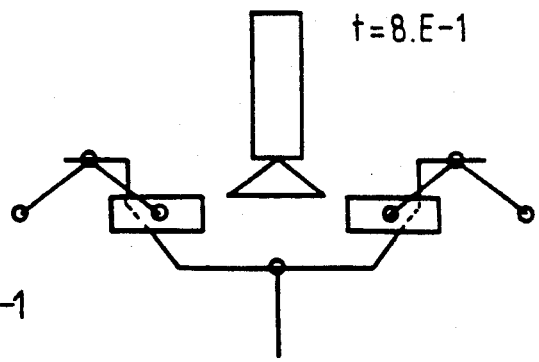
Figure 18C:
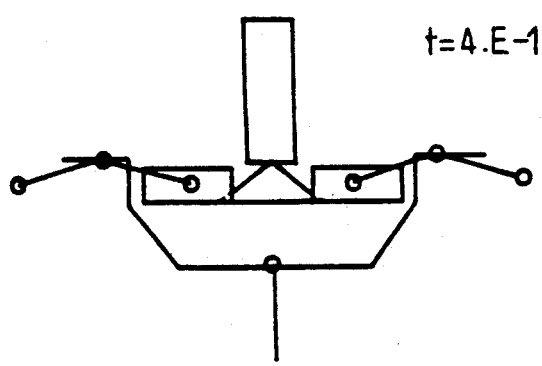
Figure 19A:
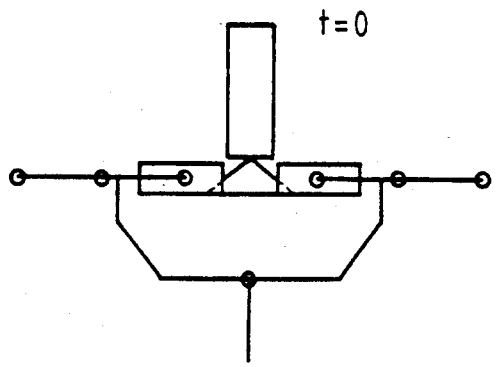
Figure 19B:
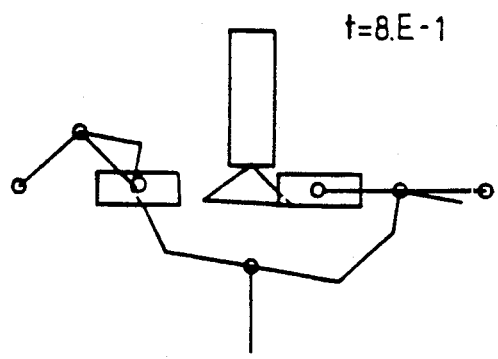
Figure 19C:
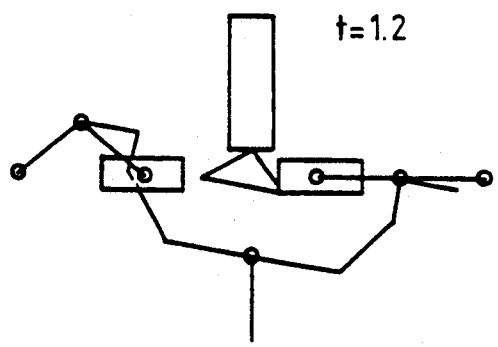
Figure 19D:
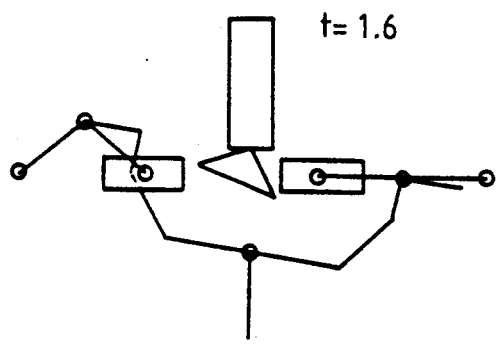
Figure 19E:
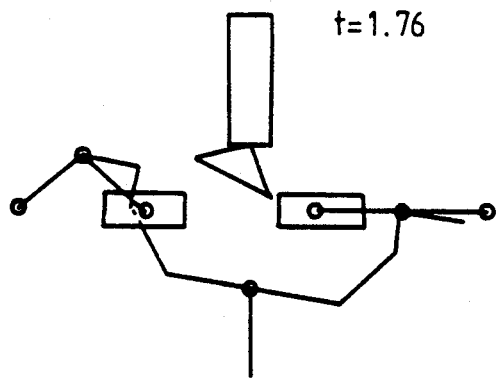

Various positions are possible for the interface 50 relative to the center of mass (CM) of the payload 10, as shown in FIGS. 16 and 17: in FIG. 16, the interface is shown as being relatively distant from CM, whereas in FIG. 17, it is shown as being disposed as substantially the same level as CM. The FIG. 17 dispositions withstands lateral forces better (i.e. forces perpendicular to the main axis of the jettisoning device) since they do not affect the connection rod.

Naturally, other solutions could be designed to obtain a stable seat for the payload: for example, three plates could be spaced apart from one another at 120° intervals and could slope relative to the main axis, thereby providing a tetrahedral primitive surface (this solution is not shown).

An analysis of such alternative solutions is, however, of little importance in the context of the present invention since they do not affect the principle on which the interface is designed. The base can be made in such a manner as to satisfy the relevant stiffness constraints without having any effect on the basic design.

The connection is made by a single rod (cf. reference 30 in FIG. 1), having one end fixed to the satellite 100 and having its other end fixed to the payload 10.

In terms of connection stiffness, the fastening force between the payload and the satellite can be expressed by the following simplified equation:

$$F = F_0 + Kx$$

where:
$F_0 = m_s F_{max}$ = prestress
$m_s$ = safety margin
$F_{max}$ = maximum allowable load (including force factors).
$K$ = total stiffness.

For reasons of simplicity, the two contributions to total stiffness may be representative by two springs working in parallel, one representing the interface and the other representing the connection.

Given that the stiffness of the connection rod 30 is much lower than that of the interface 50, the contribution of the connection rod 30 to total stiffness may be neglected. The connection rod serves essentially to provide the fastening force, which is one of the critical parameters of the design.

The releasable latching device is defined by a solution that is very simple and original, while also providing a certain number of advantages, as provided by the device 40 shown in FIGS. 4 to 6. Two half-collars 41 and 42 engage one end of the connection rod 30. The rod 30 is fitted with a flange (as referenced 31 in FIG. 5) to provide reaction for the fastening force. The half-collars 41 and 42 are slidably mounted on rails 43 extending perpendicularly to the main axis of the jettisoning device and they are easily sized to withstand the forces applied. Instead of using simple rails as shown in FIGS. 4 to 6, frictionless sliders such as those having recirculating ball tracks could be used to improve the performance of the jettisoning device.

The release device moves the half-collars 41 and 42 radially outwards relative to the rod 30, thereby unlatching it. Under the action of the diaphragm spring 20 the payload is ejected. To provide the ability to compensate for an operating fault, a swivel-head bolt 35 is used, as shown in FIG. 7. This bolt has a head 32 that pivots about the center of a support 33 disposed at one end of the connection rod 30. The tension in the rod can be adjusted by tightening the support 33 during assembly. The half-collars 41 and 42 come into abutment against a flange 31 which is secured to the connection rod 30 via the threaded end of the bolt 34. In the event of one of the half-collars failing to operate when the release device is activated, the swivel-head bolt 35 allows the rod to escape from that half-collar. This ensures that the payload 10 separates, as required.

Figure 8:
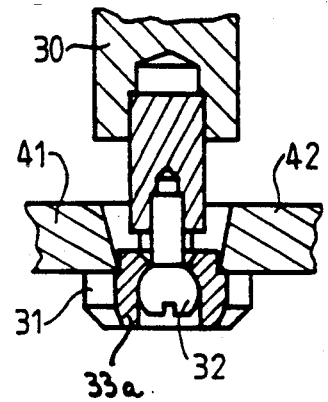
FIG. 8 shows a variant embodiment of the swivel fastening means shown in FIG. 7.

The disposition shown in FIG. 8 is also possible. In this case the head 32 swivels in a support 33a held by the two clamping half-collars 41 and 42 and housed in the flange 31.

The tension of the rod 30 is adjustable by means of the support 33a disposed at the end of the rod 30.

This second solution may be preferable because it provides more reliable disengagement of the latching components 41 and 42. Naturally, the way a selection is made between the variants shown in FIGS. 7 and 8 depends on the design details of the various parts.

To facilitate disengaging the flange 31 from the collars 41 and 42, the contact surface between the collars and the flange may be slightly conical instead of being flat (even though this has a detrimental effect on the stability of the flange: there exists a force component directed along the direction of motion of the flange, i.e. along one or other of the two half-collars 41 and 42). It is therefore necessary to optimize the pivoting cone angle.

The release device is closely linked to the latching device 40.

Figure 9:
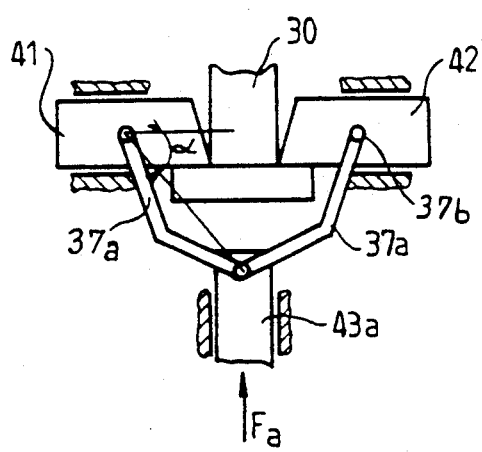
FIG. 9 is a cutaway diagrammatic view showing a first theoretical solution for the release device of the invention.
Figure 10:
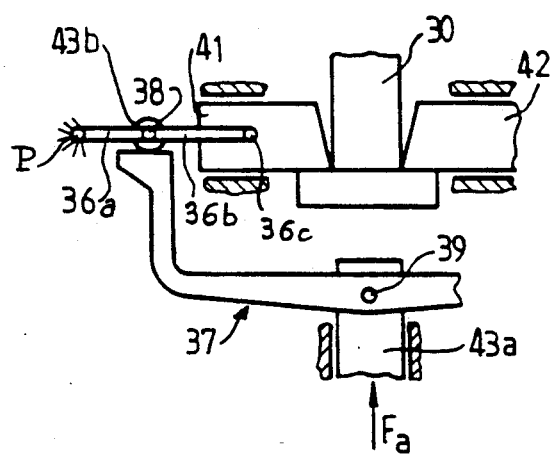
FIG. 10 is likewise a cutaway diagrammatic view of the solution actually adopted for the release device.

For reasons of simplicity, the solutions shown in FIG. 9 was considered before the solution shown in FIG. 10 (the pivoting head bolt is not shown in the figure).

The two collars 42 and 42 are controlled by an actuator device comprising a slider 43a that moves along the axis of the fastening rod 30 by means of a secondary spring 20a, and a fork 37 that is mounted to pivot about an axis 39 on the slider 43a. The fork 37 includes two arms 37a which are connected to respective one of the two half-collars 41 and 42.

In the example shown in FIG. 9, each arm 37a of the fork 37 is hinged at one end about an axis 37b to the associated half-collar 41 or 42 and at its other end about an axis 39 to the slider 43a.

When the initially prestressed secondary spring 20a is released, it causes the slider 43a to move axially. The fork 37 driven by the slider 43a acts via the arms 37a on the two half-collars 41 and 42 and causes them to slide along the rails 43 in two opposite directions. The bolt 35 is released, thereby releasing the diaphragm spring 20 which relaxes, thereby causing the payload 10 to be jettisoned.

An analysis of the forces has shown that the transmission angle $\alpha$ should be relatively small to ensure good reduction of the force required for retracting the two half-collars 41 and 42. This leads to an upper limit on the stroke thereof.

The characteristic dimensions of these collars and of the fastening rod 31, and also the values of the coefficients of friction play an important role in the force relationships. The slightly more complex device shown in FIG. 10 has also been analyzed.

In FIG. 10, each half-collar 41 and 42 is associated with a deformable hinged system comprising two levers 36a and 36b whose adjacent ends are hinged to each other by a hinge 38, while their opposite ends are hinged respectively to a fixed point P and to the corresponding half-collar 41 or 42 about a respective axis 36c. When the two half-collars 41 and 42 are engaged on the swivel bolt 35, the two levers 36a and 36b of each hinged system are substantially in alignment with each other. The two arms 37a of the fork 37 are secured to each other so as to constitute a single arm that pivots about an axis 39 on the slider 43a. The free end of each of the arms 37a bears against the associated hinged system, e.g. via a ball bearing 43b mounted about the hinge 38 between the two levers 36a and 36b. When the slider 43a moves axially, each arm 37a presses against the ball bearing 43b of the associated hinged system, thereby forcing the two levers 36a and 36b to pivot about their hinge 38. Pivoting of the levers 36a and 36b causes the half-collars 41 and 42 to slide in two opposite directions. The bolt 35 is thus released, as is the diaphragm spring 20, thereby causing the payload 10 to be jettisoned.

Should one of the half-collars 41 and 42 remain jammed, then the end of the arm 37a bearing against the hinge 38 of the corresponding hinge system slides over the ball bearing 43b of said hinge 38 which is then stationary. The fork 37 pivots about its axis 39 and causes the other half-collar to slide. Under such circumstances, the fastening rod 38 is released by the bolt 37 pivoting about the half-collar that remains jammed under drive from the diaphragm spring 20, thereby causing the payload 10 to be jettisoned.

Simple pins can be used instead of bearings 43b shown in FIG. 10 for transmitting the activation force $F_a$.

The releasable latching device in accordance with the invention makes use of the "overcenter principle", i.e. the principle well known in the art (cf. in article the article by R. Birner and H. Ral, mentioned above) and used for ensuring that the two half-collars are stable while latched so as to clamp a swivel-head bolt between them. Use of this principle gives rise to an additional advantage due to the fact that minimum force is required to initiate movement of the half-collars. The sequence in the process of separating the half-collars is shown in FIGS. 18a to 18e, while FIGS. 19a to 19e show the same sequence, at different instants, for the case where one of the half-collars is jammed, thereby clarifying the function of the swivel-head bolt (represented for reasons of simplicity in these diagrammatic figures by means of a triangle that pivots about the bottom end of the connection rod). Because this bolt swivels under the action of the diaphragm spring acting on the top end of the connection rod, it is capable of escaping from a jammed half-collar, thereby enabling the rod to be released and thus enabling the payload to which it is connected to be jettisoned, in spite of one of the two half-collars being jammed. It is precisely this condition that satisfies the above-specified "redundant" feature of the latching.

Figure 11:
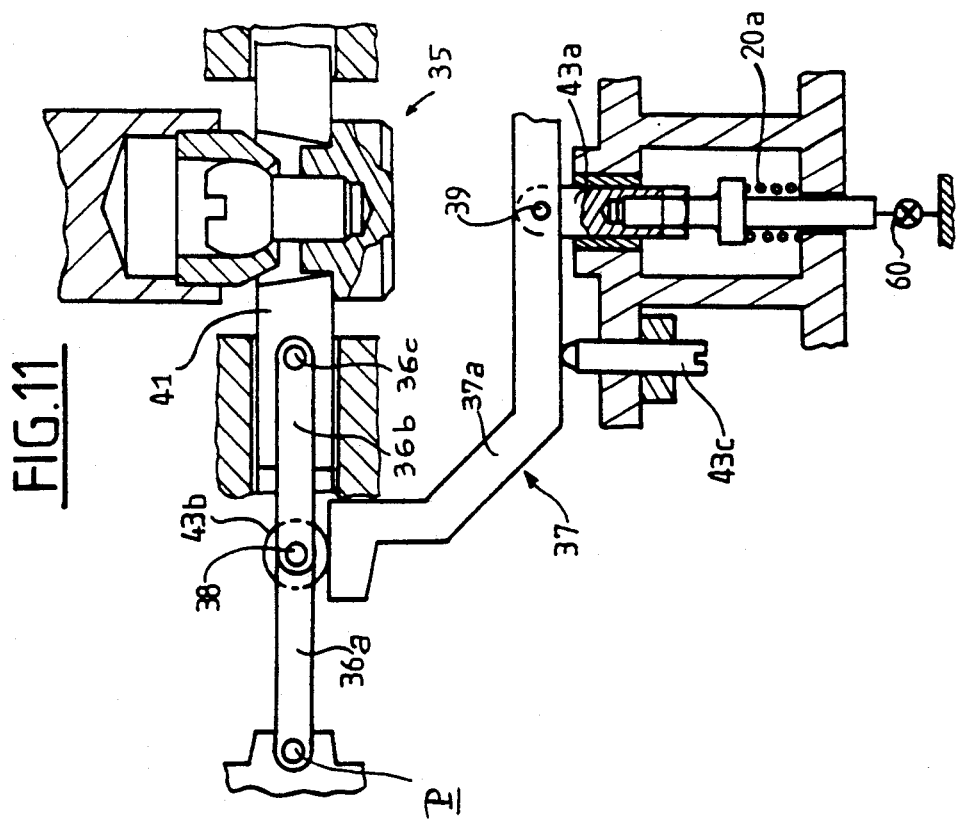
FIG. 11 is a cutaway axial section view at a scale of 2 to 1 showing details of the embodiment shown diagrammatically in FIG. 10.

The release device can be activated by unloading a secondary spring 20a which may be triggered by a hot knife or by an electromagnetic device (represented diagrammatically by reference 60 in FIG. 11). Because of the large mechanical advantage obtained, the triggering energy required is not high.

Naturally, this constitutes a considerable advantage of the device of the present invention, and is in compliance with above-mentioned constraints 8 and 9.

There follows an analysis of certain fundamental criteria concerning the preliminary design of the essential dimensions and of the main components of the jettisoning device of the invention as shown in FIG. 11 which shows a detail at a scale of 2 to 1 of the embodiment shown diagrammatically in FIG. 10. Naturally, the same components are given the same references as in the preceding figure. The figure also shows a bolt such as that referenced 43c, and enabling the release device to be centered and also enabling the prestress of the secondary spring 20a to be adjusted.

As already mentioned above, the leading criteria of the design are:
 the stiffness of the assembly with the payload; and
 the maximum force allowed on said payload.

The first of these parameters depends greatly on the type of payload and on the intended application, and it concerns the design of the interface 50.

The second parameter depends greatly on the conditions defined by the environment applicable to the payload in question, and governs the design of the components of the jettisoning device that must withstand the connection force.

Figure 12:
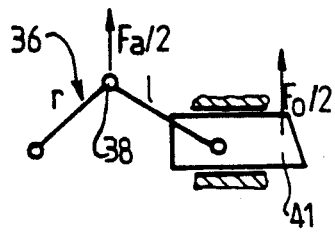
FIGS. 12 to 15 are diagrams showing various components of the release device of the invention for use in following the calculations performed in a feasibility study on the solution adopted by the present invention.
Figure 13:
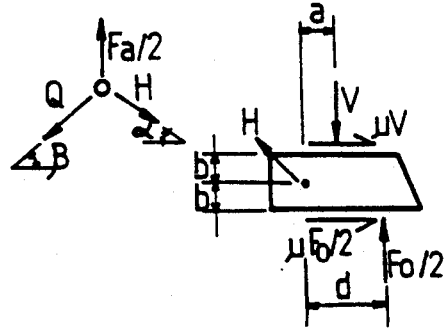

The force $F_a$ required for releasing the half-collars 41 and 42 is obtained from the following equilibrium equations (see FIGS. 12 and 13):

$$H \cos \alpha = Q \cos \beta$$

$$\tfrac{1}{2}F_a = H \sin \alpha + Q \sin \beta$$

$$H \cos \alpha = \mu(V + \tfrac{1}{2}F_0)$$

$$H \sin \alpha = \tfrac{1}{2}F_0 = V$$

$$\tfrac{1}{2}F_0 d = \tfrac{1}{2}F_0 \mu b = \mu V b + V a$$

where d is the position of the connection force $F_O$ on a half-collar (with the values corresponding to the two half-collars 41 and 42 being written respectively $d_1$ and $d_2$).

Manifestly this is a system of five equations in the following five unknowns:
 $F_a$ = external activation force;
 $Q$ = force acting on one of the arms of the above-mentioned hinge-and-slide system;
 $H$ = force acting on the other arm of the same system;
 $V$ = the reaction of the rail on each half-collar; and
 $a$ = the location of V on a half-collar.

This system of equations is easily solved by also taking account of the following geometrical constraints:

$$r \sin \beta = l \sin \alpha$$

where l and r are the lengths of the two arms of the above-mentioned hinge-and-slide system.

The resulting expressions for $F_a$ and for V can be expressed as pure numbers:

$$F_a/F_0 = (2\mu \sin \alpha + \tan \beta \cos \alpha)/(\cos \alpha - \mu \sin \alpha)$$

$$V/F_0 = \mu \sin \alpha/(\cos \alpha - \mu \sin \alpha) + \tfrac{1}{2}$$

$$a = F_0(d + \mu b)/2V - \mu b.$$

The first expression is most important in the present analysis and is referred to as the "Force Reduction Ratio" (FRR). This ratio corresponds to a mechanical advantage (see the worked example below) and may be used as an indicator to ensure that good force reduction is achieved at the end of the stroke.

A limit is put on the stroke Because the ratio $F_a/F_0$ increases rapidly with $\alpha$.

The stroke of the collar is given by:

$$s = r(1 - \cos \beta) + l(1 - \cos \alpha).$$

The minimum stroke is thus a governing parameter of the design and has a particular effect on the design of the release device.

It should be observed that the stroke is closely tied to the design of the flange, i.e. to the limit on contact pressure.

For an initial design, assume that:

$$s_{min} = 5 \text{ mm}.$$

There are several parameters of interest that are available to the designer for optimizing the characteristics of the jettisoning device.

Various cases have been examined and it has been found out that:
 $r = l$ is a condition that provides acceptable compromise in terms of stroke and FRR;
 $r < l$ is a condition that provides longer strokes, but penalizes FRR; and
 $r > l$ is a condition that provides a smaller FRR, but at the cost of a shorter stroke.

Friction also has an effect on behavior and thus on the technical result, but not significantly, which is an advantage of this concept.

Realistic values for the static and dynamic coefficients of friction are given by 0.25 and 0.20 respectively.

Taking the above into account, the following set of parameters can be proposed for defining the main characteristics of the release device:

$$\alpha = 30°$$

$$r = l = 20 \text{ mm}$$

$\mu = 0.20$ $b = 3$ mm $d = 5$ mm $s_{min} = 5$ mm with the above data giving the following:

$F_a/F_0 = 0.522$ $V/F_0 = 0.630$ $a = 3.55$ mm $s = 5.35$ mm.

It is easily shown that:

$s > s_{min}$ and also that the condition for stability is satisfied, namely that:

$a < d$.

As already mentioned above, the above parameters can be modified slightly so as to reduce the FRR and increase the stroke as a function of more exact design constraints.

For example, the stroke may be increased by putting:

$\alpha = 35°$ while keeping all the other parameters unchanged.
Under such circumstances:

$s = 7.23$ mm and $F_a/F_0 = 0.651$ which value is still sufficiently low.

There follows a second example of how the above-given set of parameters can be modified for the purpose of obtaining a device which is more compact. Assuming:

$\alpha = 35°$ $r = l = 15$ mm $\mu = 0.20$ $b = 3$ mm $d = 5$ mm it follows that:

$F_a/F_0 = 0.651$ $V/F_0 = 0.663$ $a = 3.62$ mm $s = 5.42$ mm.

If steps are taken to reduce the coefficient of friction of the rails on each half-collar (see the latching device described above), then a smaller coefficient of friction may be used, given by:

$\mu = 0.05$.

Under such circumstances, and assuming that all the other parameters remain unchanged from the previous example, it results that:

$F_a/F_0 = 0.145$ $V/F_0 = 0.536$ $a = 4.65$ mm $< d$ $s = 5.42$ mm (unchanged).

The considerable decrease in FRR shows the advantages of reducing the coefficient of friction, even if that requires more complex parts to be manufactured.

The behavior of the jettisoning device in the event of one of the half-collars failing to operate is studied below.

Figure 14:
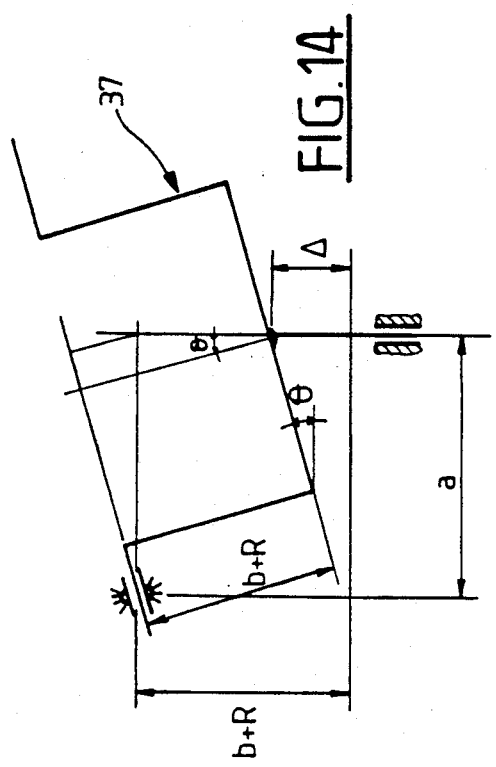
Figure 15:
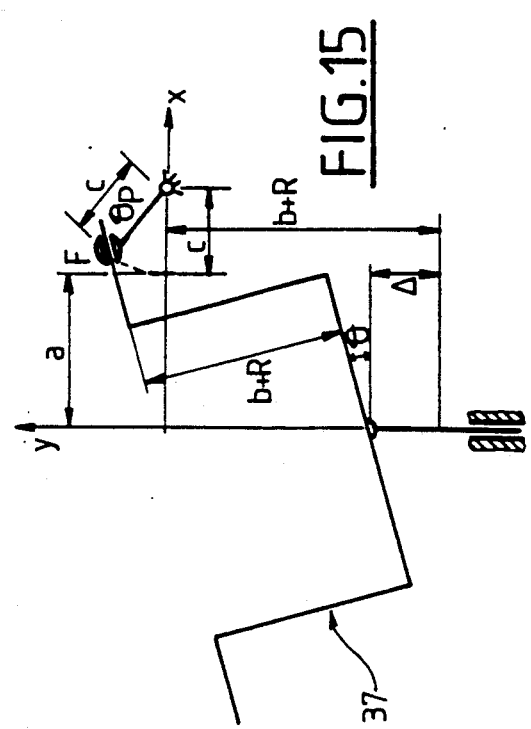

It is assumed that when the balancing fork 37 moves upwards under drive from the guide slider 43a, one of the two half-collars does not move (cf. FIGS. 14 and 15).

The action of the fork is thus not shared uniformly between the two half-collars, but this does not prevent the half-collar that is not jammed from being retracted, as required.

The kinematics of the fork has been investigated to determine the stroke of the half-collar that is not jammed. The following geometrical relationship is used to determine the fork rotation induced by an upwards displacement $\Delta$ of its hinge:

$$a \sin \theta + (b + R - \Delta) \cos \theta = b + R.$$

By using the following substitutions:

$\sin \theta = 2t/(1 + t^2)$ $\cos \theta = (1 - t^2)/(1 + t^2)$ where:

$t = \tan(\theta/2)$ a second order linear equation in t is obtained giving:

$$\theta = 2 \arctan[(A - \sqrt{(A^2 + B^2 - C^2)})/(B + C)]$$

where:

$A = a$ $B = b + R - \Delta$ $C = b + R$.

Under these circumstances, the rotation of the hinged rod 36 of the release device on the side which is not jammed is given by:

$\theta_p = \arcsin(Y_f/r)$ where:

$$Y_f = mX_f + n$$

$$m = \tan\theta$$

$$X_f = [-B' - \sqrt{(B'^2 - A'C')}]/A'$$

$$A' = m^2 + 1$$

$$B' = mn - X_d$$

$$C' = n^2 + X_d^2 - r^2$$

$$n = Y_b - mX_b$$

$$Y_b = a\sin\theta + (b + r)\cos\theta - (b + r)$$

$$X_b = a\cos\theta - (b + r)\sin\theta$$

The stroke is thus given by the expression:

$$s = r(1 - \cos\beta) + l(1 - \cos\alpha)$$

where:

$$\beta = \theta_p$$

$$\alpha = \arcsin [(r/l) \sin \beta].$$

If the following parameters are given the values specified below:

$$a = 22 \text{ mm}$$

$$\Delta = 6 \text{ mm}$$

$$b = 17 \text{ mm}$$

$$R = 2 \text{ mm}$$

$$X_d = 42.5 \text{ mm}$$

it follows that:

$$s = 9.846 \text{ mm}$$

which value is about twice the minimum stroke necessary.

It can therefore be concluded that in the event of one of the half-collars jamming, the other one is retracted at a velocity greater than the nominal velocity, thereby, in any event, enabling the connection rod to be released.

The development of the design of the device for releasing the connection rod has taken up a major portion of the effort that was required for designing the jettisoning device of the invention, and it constitutes an essential component thereof.

The invention relates in fact to a general purpose release device that may have a wide range of applications. In space it could be adopted without significant changes for retaining a stack of solar panels (such as the Eureca and Columbus type), with significant improvements in terms of operating reliability compared with the solutions commonly proposed and adopted in the prior art.

Outside space, other applications relate to quick release of "loaded" devices, such as the actuators of valves used in power plants, with improvements in safety and operating aspects over the corresponding state of the art.

As can be seen from the above, the invention is not limited in any way to the embodiments and the application described in greater detail. On the contrary, the invention covers all variants that may occur to the person skilled in the art without going beyond the ambit or the scope of the present invention.

I claim:

1. A device for jettisoning a payload from a spacecraft, the device comprising:
    a single connection rod in alignment with the axis of symmetry of the jettisoning device and having a first end fixed to the payload;
    a releasable latching device supported by the spacecraft and acting on the second end of the connection rod by means of two moving fastener elements; and
    an energy storage device acting permanently on the first end of the connection rod to jettison the payload when the connection rod is released by at least one of the fastener elements under the control of an actuator device;
    wherein the two fastener elements are diametrically opposite about the connection rod and movable in translation in two opposite directions in alignment on an axis perpendicular to the connection rod, the two fastener elements engaging with an intermediate device pivotally mounted towards the second end of the connection rod, and wherein the actuator device comprises a slider movable along the axis of the rod, and a fork mounted to pivot on the slider and including two arms connected to respective ones of the two fastener elements.

2. A jettisoning device according to claim 1, wherein the device for storing the energy for jettisoning the payload is constituted by a diaphragm spring.

3. A jettisoning device according to claim 2, wherein the diaphragm spring includes radial notches and has a profile in axial section that bulges.

4. A jettisoning device according to claim 1, wherein the fork of the actuator device pivots during displacement of the slider to move away one of the fastener elements in the event that the other element remains jammed, the intermediate device pivoting about the jammed fastener element under drive from the energy storage device to release the connection rod.

5. A jettisoning device according to claim 4, wherein each arm of the fork is hinged towards one end to the associated fastener element, and is pivotally mounted towards its other end on the slider.

6. A jettisoning device according to claim 4, wherein the two arms of the fork are secured to each other to form a single arm that is pivotally mounted on the slider.

7. A jettisoning device according to claim 6, wherein each fastener element is connected to a deformable hinged system comprising two links whose two adjacent ends are hinged together by a hinge and whose two opposite ends are hinged respectively to a fixed point and to said associated fastener element about a hinge, and wherein each arm of the fork bears against the associated deformable hinged system to deform it during displacement of the slider.

8. A jettisoning device according to claim 5, wherein the actuator device also includes a spring for displacing the slider along the axis of the connection rod.

9. A jettisoning device according to claim 8, wherein the spring in the prestressed state is released by an electromagnetic device.

10. A jettisoning device according to claim 7, wherein the actuator device also includes a spring for displacing the slider along the axis of the connection rod.

11. A jettisoning device according to claim 10, wherein the spring in the prestressed state is released by an electromagnetic device.

12. A jettisoning device according to claim 1, wherein there exists a separation interface between the satellite and the payload, which interface is defined by a seat constituted by a conical surface.

13. A jettisoning device according to claim 1, wherein there exists a separation interface between the satellite and the payload, which interface is defined by a seat constituted by a tetrahedral surface.

* * * * *